United States Patent [19]

Hirabayashi et al.

[11] Patent Number: 5,548,006
[45] Date of Patent: Aug. 20, 1996

[54] SILICONE RUBBER COMPOSITIONS

[75] Inventors: Satao Hirabayashi; Tsutomu Nakamura, both of Usui-gun, Japan

[73] Assignee: Shin-Etsu Chemical Co., Ltd., Tokyo, Japan

[21] Appl. No.: 341,085

[22] Filed: Nov. 17, 1994

[30] Foreign Application Priority Data

Nov. 18, 1993 [JP] Japan ................................. 5-312534
Apr. 25, 1994 [JP] Japan ................................. 6-108963

[51] Int. Cl.$^6$ ............................................... C08K 5/45
[52] U.S. Cl. ............................ 524/82; 524/100; 524/101; 524/392; 524/588; 525/478; 528/15; 528/21; 528/23; 528/31
[58] Field of Search ............................ 524/82, 100, 101, 524/392, 588; 525/478; 528/15, 21, 23, 31

[56] References Cited

U.S. PATENT DOCUMENTS

| 4,762,879 | 8/1988 | Letoffe et al. ......................... 524/101 |
| 5,059,647 | 10/1991 | Kawaguchi et al. .................... 524/101 |
| 5,104,919 | 4/1992 | Okami et al. ........................... 524/100 |

FOREIGN PATENT DOCUMENTS

| 2251601 | 6/1975 | France . |
| 50-020640 | 7/1975 | Japan ................................. 524/101 |
| 60-119958 | 6/1985 | Japan . |
| 03-064389 | 3/1991 | Japan ................................. 524/101 |
| 1476163 | 6/1977 | United Kingdom . |
| 2075536 | 11/1981 | United Kingdom . |

*Primary Examiner*—Mark D. Sweet
*Attorney, Agent, or Firm*—Millen, White, Zelane & Branigan, P.C.

[57] ABSTRACT

An addition curing type silicone rubber composition comprising an aliphatic unsaturated group-containing organopolysiloxane, an organohydrogenpolysiloxane and a platinum series catalyst is further blended with a triazine or sulfide control agent to provide a composition which is stable and resistant against premature gelation at room temperature and thus has long-term storage stability. Heating causes the composition to be quickly vulcanized at an acceptable rate into a silicone rubber having satisfactory physical properties.

16 Claims, No Drawings

SILICONE RUBBER COMPOSITIONS

BACKGROUND OF THE INVENTION

1. Field of the Invention

This invention relates to an addition curing type silicone rubber composition containing a platinum series catalyst, and more particularly, to a silicone rubber composition which is stabilized against premature gelation at room temperature.

2. Prior Art

Conventional silicone rubber compositions are loaded with platinum series catalysts for promoting addition reaction between an aliphatic unsaturated group-containing organopolysiloxane and an organohydrogenpolysiloxane. The crosslinking rate of this addition reaction is generally high albeit some dependency on the activity of the catalysts. As a consequence, control agents or curing inhibitors are added to most compositions for preventing premature gelation at room temperature, thereby imparting potential curability to the compositions in the sense that the composition are stable and remain unchanged over a long period of time, but can be cured by heating.

Known such control agents are ethylenically unsaturated isocyanurates and compounds having a hydroperoxide —C—O—O—H structure as disclosed in Japanese Patent Publication (Jp-B) Nos. 41626/1980 and 20340/1982. However, the former control agents are less effective for controlling the platinum series catalysts. The latter control agents must be added in a carefully controlled amount because otherwise vulcanization does not take place or the vulcanization rate is slow.

For preventing premature gelation at room temperature, it is also proposed to contain the platinum series catalyst and the organohydrogenpolysiloxane in separate packs which are mixed on use. This requires an additional operation of mixing two components.

Although a number of premature gelation inhibitors are currently available, many control agents, typically acetylene alcohol agents are volatile. Since they lose control ability by volatilization, they cannot survive over a long working life. Such control agents must be added in excess of the necessity.

SUMMARY OF THE INVENTION

Therefore, an object of the present invention is to provide an addition curing type silicone rubber composition which contains an aliphatic unsaturated group-containing organopolysiloxane, a platinum series catalyst, and an organohydrogenpolysiloxane in a single pack and which is stabilized against premature gelation, has a long working life at room temperature, and is thus improved in workability.

The invention pertains to an addition curing type silicone rubber composition comprising (A) an organopolysiloxane of the following average compositional formula (1):

wherein $R^1$ is a substituted or unsubstituted monovalent hydrocarbon group, and letter n is a positive number of 1.98 to 2.02, containing at least two aliphatic unsaturated groups in a molecule, (B) an organohydrogenpolysiloxane of the following average compositional formula (2):

wherein $R^2$ is a substituted or unsubstituted monovalent hydrocarbon group, letters a and b are in the range: $0 \leq a < 3$ and $0.005 \leq b \leq 2$, and $0.8 \leq a+b \leq 3.0$, having at least two hydrogen atoms attached to silicon atoms in a molecule, and (C) a platinum series catalyst. We have found that by blending a triazine of general formula (3) or a sulfide of general formula (4), both shown below, in the silicone rubber composition, the composition is prevented from premature gelation to ensure a long working life at room temperature without detracting from silicone rubber physical properties.

The triazine used herein is of the following general formula (3):

wherein $R^3$, $R^4$, and $R^5$ are independently selected from the group consisting of a peroxy group, monovalent hydrocarbon group, hydroxyl group and hydrogen atom, at least one of $R^3$, $R^4$, and $R^5$ being a peroxy group.

The sulfide used herein is of the following general formula (4):

wherein $R^6$ and $R^7$ is a monovalent hydrocarbon group having at least 3 carbon atoms or a monovalent hydrocarbon group having an ester bond or $R^6$ and $R^7$ taken together may form a ring structure, and letter m is a positive number of 1 to 3.

Therefore, the present invention provides a silicone rubber composition comprising (A) an organopolysiloxane of average compositional formula (1) containing at least two aliphatic unsaturated groups in a molecule, (B) organohydrogenpolysiloxane of average compositional formula (2) containing at least two hydrogen atoms each attached to a silicon atom in a molecule, (C) a platinum series catalyst, and (D) a control agent selected from the group consisting of a triazine of general formula (3) and a sulfide of general formula (4).

DETAILED DESCRIPTION OF THE INVENTION

A first essential component or component (A) of the silicone rubber composition according to the invention is an organopolysiloxane of the following average compositional formula (1).

$R^1$ is a substituted or unsubstituted monovalent hydrocarbon group. Letter n is a positive number of 1.98 to 2.02.

In formula (1), $R^1$ is a substituted or unsubstituted monovalent hydrocarbon group preferably having 1 to 20 carbon atoms, more preferably 1 to 8 carbon atoms. The $R^1$ groups include aliphatic saturated hydrocarbon groups, for example, alkyl groups such as methyl, ethyl, propyl and butyl and cycloalkyl groups such as cyclohexyl; aliphatic unsaturated hydrocarbon groups, for example, alkenyl groups such as vinyl, allyl, butenyl and hexenyl groups; aryl groups such as phenyl and tolyl groups; and substituted hydrocarbon groups wherein some or all of the hydrogen atoms attached to carbon atoms are replaced by halogen atoms or cyano groups, for example, chloromethyl, trifluoro-propyl and cyanoethyl groups. More preferred are methyl, phenyl and trifluoropropyl groups.

Although the $R^1$ groups may be identical or different, the organopolysiloxane should contain at least two aliphatic unsaturated groups in a molecule, preferably at least two alkenyl groups having 2 to 10 carbon atoms, especially at least two vinyl groups. The aliphatic unsaturated group should preferably be contained in an amount of 0.001 to 20 mol %, more preferably 0.025 to 5 mol % of the entire $R^1$ groups.

Letter n is a positive number of 1.98 to 2.02. The organopolysiloxane of formula (1) is generally preferred to be linear although it is acceptable to use different molecular structures, for example, branched or three-dimensional network organopolysiloxanes.

The organopolysiloxane preferably has a degree of polymerization of 100 to 10,000, more preferably 5,000 to 8,000.

A second essential component or component (B) is an organohydrogenpolysiloxane which serves as a curing agent and has the following average compositional formula (2).

$$R_a^2 H_b SiO_{(4-a-b)/2} \qquad (2)$$

$R^2$ is a substituted or unsubstituted monovalent hydrocarbon group. Letter a is a positive number of $0 \leq a < 3$ and b is a positive number of from 0.005 to 2, and the sum of a and b is from 0.8 to 3.0. The organohydrogenpolysiloxane should have at least two hydrogen atoms each attached to a silicon atom in a molecule.

The groups represented by $R^2$ may be identical or different and their examples are the same as described for $R^1$ in formula (1).

The organohydrogenpolysiloxane of formula (2) may be linear, branched or cyclic and preferably has a degree of polymerization of up to 300.

Examples of the organohydrogenpolysiloxane of formula (2) include a diorganopolysiloxane end-blocked with a dimethylhydrogensilyl group, a copolymer of a dimethylsiloxane unit, a methylhydrogensiloxane unit, and a terminal trimethylsiloxy unit, a low viscosity fluid consisting of a dimethylhydrogensiloxane unit ($H(CH_3)_2SiO_{1/2}$ unit) and a $SiO_2$ unit, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

Desirably the organohydrogenpolysiloxane of formula (2) is blended in such amounts that the hydrogen atom directly attached to a silicon atom in the organohydrogenpolysiloxane is available in an amount of 50 to 500 mol % based on the aliphatic unsaturated group (e.g., alkenyl group) in the organopolysiloxane or component (A).

A third essential component or component (C) is a platinum series catalyst which may be selected from conventional known ones. Exemplary platinum catalysts include elemental platinum alone, platinum compounds, platinum compositions, chloroplatinic acid, and complexes of chloroplatinic acid with alcohols, aldehydes, ethers, and olefins. The platinum series catalyst is used in a catalytic amount, preferably such that platinum atom is available in an amount of 1 to 2,000 ppm based on the organopolysiloxane or component (A).

According to the present invention, a triazine of the general formula (3) or a sulfide of the general formula (4) is blended as a fourth essential component or component (D).

Triazine

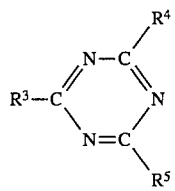

(3)

$R^3$, $R^4$, and $R^5$ are independently selected from the group consisting of a peroxy group, monovalent hydrocarbon group, hydroxyl group and hydrogen atom. At least one of $R^3$, $R^4$, and $R^5$ is a peroxy group and preferably all of $R^3$, $R^4$, and $R^5$ are peroxy groups.

The peroxy group is a group having the peroxy structure represented by —OOR wherein R is a substituted or unsubstituted monovalent hydrocarbon group having 1 to 30 carbon atoms, especially 1 to 10 carbon atoms, or a substituted or unsubstituted monovalent hydrocarbon group having 1 to 30 carbon atoms, especially 1 to 10 carbon atoms and a =C=O group. Exemplary peroxy groups are shown below.

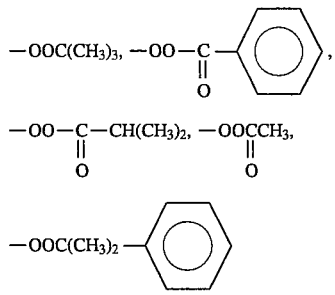

Several illustrative, non-limiting examples of the triazine are given below.

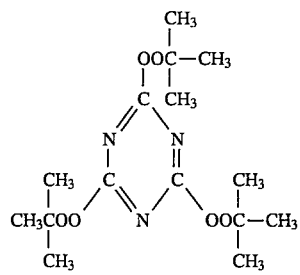

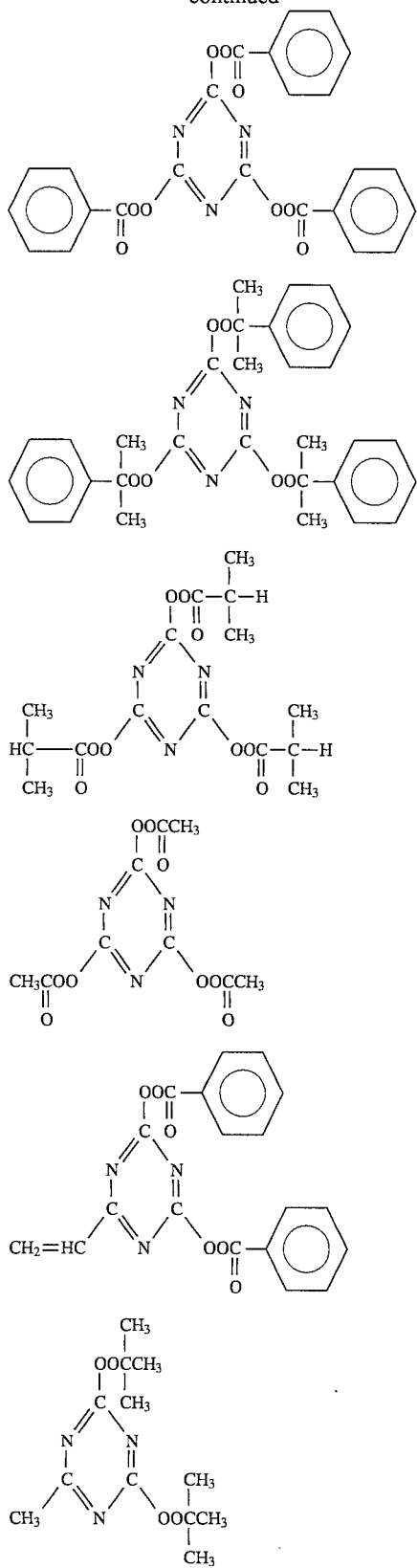

Preferably the triazine is used in amounts of at least 0.005 part, more preferably 0.005 to 1 part, most preferably 0.01 to 0.5 part by weight per 100 parts by weight of the organopolysiloxane or component (A).

Sulfide $$R^6—(S)_m—R^7 \qquad (4)$$

Each of $R^6$ and $R^7$ is a monovalent hydrocarbon group having at least 3 carbon atoms or a monovalent hydrocarbon group having an ester bond. Alternatively $R^6$ and $R^7$, taken together, form a ring structure. Letter m is a positive number of 1 to 3.

The sulfide compound functions as a control agent for a silicone rubber composition. When added in appropriate amounts, it is effective for improving the storage stability and hence, the pot life of a silicone rubber composition without the aid of another well-known control agent while preventing premature gelation at room temperature and avoiding any lowering in rate of subsequent vulcanization. When the silicone rubber composition loaded with the sulfide is heated at normal vulcanization temperatures of about 100° to 130° C. or higher, the vulcanization rate is equal to or slightly higher than the conventional rate. That is, the sulfide serves as a vulcanizing agent having temperature dependency.

In formula (4), each of $R^6$ and $R^7$ is a monovalent hydrocarbon group having at least 3 carbon atoms, desirably 3 to 50 carbon atoms, more desirably 7 to 50 carbon atoms or a monovalent hydrocarbon group having an ester bond in the molecular backbone. Alternatively $R^6$ and $R^7$, taken together, form a ring structure having at least 3 carbon atoms in total, desirably 3 to 50 carbon atoms, more desirably 7 to 50 carbon atoms, for example, a cycloalkyl group. Example of the monovalent hydrocarbon group include alkyl groups, aryl groups, aralkyl groups, and alkenyl groups. Those sulfides of formula (4) wherein either one or both of $R^6$ and $R^7$ are monovalent hydrocarbon groups having less than 3 carbon atoms have an increased ability to poison the platinum catalyst as a sulfur compound, which results in a composition not being crosslinked or requires to increase the effective platinum amount. Those sulfides of formula (4) wherein either one or both of $R^6$ and $R^7$ are monovalent hydrocarbon groups having more than 50 carbon atoms would sometimes be less effective for preventing premature gelation and a lowering of vulcanization rate.

Letter m is a positive number of 1 to 3, preferably equal to 1 or 2. That is, the sulfide of formula (4) is preferably a monosulfide or disulfide, with the monosulfide being most preferred. With m of 4 or higher, the compound has an increased catalyst poisoning ability, failing to achieve the intended advantages or resulting in a composition not being crosslinked.

Several illustrative, non-limiting examples of the sulfide are given below.

$$S(—C_{12}H_{23})_2, \ S_2(—C_{10}H_{19})_2, \ S(—CH_2—Ph)_2,$$

$$H_{11}C_5—S—C_{12}H_{23}, \ Ph—C_2H_4—S—S—C_{10}H_{21},$$

$$S_3(—C_5H_{10}\underset{O}{\underset{\|}{C}}O—C_{21}H_{43})_2, \ S(—CH_2\underset{O}{\underset{\|}{C}}O—C_{10}H_{21})_2,$$

$$H_{21}C_{10}—S—C_4H_8\underset{O}{\underset{\|}{C}}O—C_{10}H_{21},$$

$$Ph—OCH_6C_3—\underset{O}{\underset{\|}{S}}—C_{10}H_{21}$$

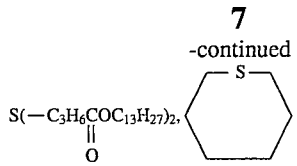

Note that Ph is phenyl.

Preferably the sulfide is used in amounts of 0,005 to 5 parts, more preferably 0.01 to 1 part by weight per 100 parts by weight of the organopolysiloxane or component (A). Less than 0.005 part of the sulfide would be less effective for preventing premature gelation whereas more than 5 parts of the sulfide would detract from rubber physical properties.

Satisfactory results are obtained when the triazine of formula (3) or the sulfide of formula (4) is used alone although it may be combined with another control agent if desired. Particularly when the sulfide of formula (4) is combined with another control agent, a significantly enhanced control effect is expectable. For example, when the sulfide is combined with a sublimable control agent such as an acetylene alcohol, the silicone rubber composition can be improved in long-term working at room temperature.

For such combined use, the other control agent may be selected from well-known ones, for example, acetylene alcohols, vinylsiloxanes having a low degree of polymerization (e.g., 3 to 20, especially 3 to 10) such as 1,3-divinyl-1,1,3,3-tetramethyldisiloxane, hydroperoxides, and ethylenically unsaturated isocyanurates. Moreover, there can be used those control agents which are otherwise rejected for single addition because of too low control effect, for example, peroxides containing a carbon-to-carbon unsaturated bond such as 2,5-dimethyl-2,5-di(t-butylperoxy)hexyne-3.

The amount of the other control agent is desirably in the range where the advantages of the invention are not impaired, preferably 0.001 to 1 part by weight per 100 parts by weight of the organopolysiloxane or component (A).

Preferably reinforcing silica powder is blended in the silicone rubber composition of the invention because a silicone rubber having improved mechanical strength can be produced. For mechanical strength improvement, the reinforcing silica filler should preferably have a specific surface area of at least 50 $m^2/g$, especially 100 to 300 $m^2/g$ as measured by a BET method. Examples include fumed silica and precipitated silica, which may have been treated at the surface to be hydrophobic with suitable agents such as hexamethyldisilazane and chlorosilanes. Preferably about 5 to 70 parts by weight, more preferably about 10 to 50 parts by weight of silica filler is blended with 100 parts by weight of the organopolysiloxane or component (A). Less than 5 parts of the silica powder would be too small to achieve reinforcement whereas more than 70 parts of the silica powder would deteriorate workability and rather lower mechanical strength.

Any optional components may be added to the inventive silicone rubber composition insofar as the advantages of the invention are not lost. Such optional components include extending fillers such as ground quartz, calcium carbonate, and carbon; and organic and inorganic blowing agents for forming sponge products, such as azobisisobutyronitrile, dinitropentamethylenetetramine, and benzenesulfonhydrazide. The blowing agent is preferably added in an amount of 3 to 10 parts by weight to 100 parts by weight of the silicone rubber composition. With such a blowing agent added, a spongy silicone rubber can be obtained.

It will be understood that any of additives commonly blended in conventional silicone rubbers may be added to the inventive silicone rubber composition insofar as the advantages of the invention are not lost. Such additives include coloring agents, heat resistance enhancers, mold release agents, and filler dispersing agents (e.g., diphenylsilane diol, alkoxysilanes, carbon functional silane, and silanol group-containing low molecular weight siloxanes). They may be added in conventional amounts although the amount of the filler dispersing agent added should desirably be minimized so as not to impair the advantages of the invention.

The silicone rubber composition of the invention is prepared by mixing the essential and optional components mentioned above. Preferably the platinum series catalyst is first mixed with the organosiloxane gum and the aliphatic unsaturated group-containing organopolysiloxane having a low degree of polymerization to form a paste, which is mixed with the remaining components.

Owing to the addition of the triazine or sulfide component (D), the silicone rubber composition of the invention is stable at room temperature and does not readily gel although it contains an aliphatic unsaturated group-containing organopolysiloxane, an organohydrogenpolysiloxane and a platinum series catalyst in a single pack. When it is desired to cure the composition, the composition may be heated to 100° to 500° C. for several seconds to 5 hours. Then using any of conventional vulcanization techniques including atmospheric pressure hot air vulcanization, steam vulcanization and compression molding, the composition can be readily cured into a silicone rubber having satisfactory physical properties, which will find similar uses to conventional silicone rubbers.

There has been described an addition curing type silicone rubber composition comprising an aliphatic unsaturated group-containing organopolysiloxane, an organohydrogenpolysiloxane and a platinum series catalyst wherein a triazine or sulfide is blended therein to provide a composition which is stable and resistant against premature gelation at room temperature and thus has improved long-term storage stability. In addition, simple heating causes the composition to be quickly vulcanized at an acceptable vulcanization rate into a silicone rubber having satisfactory physical properties. The composition has a significantly extended working life at room temperature. The resulting silicone rubber can find a wide variety of uses as do conventional silicone rubbers.

EXAMPLE

Examples of the present invention are given below by way of illustration and not by way of limitation. All parts are by weight.

Example 1

A platinum paste A was first prepared by mixing 10 grams of a low-degree-of-polymerization dimethylvinylpolysiloxane substituted solution of a chloroplatinic acid-alcohol solution (having a vinyl content 0.7 mol % and a platinum content of 1.0%), 2.0 grams of 2,4,6-tris(t-butylperoxy)-1,3,5-triazine (commercially available from Kayaku Akuzo K.K.), and 88 grams of an organopolysiloxane having a vinyl content of 0.15 mol % and an average degree of polymerization of 5,000.

To 100 parts of a rubbery organopolysiloxane consisting of 99.825 mol % of a dimethylsiloxane $(CH_3)_2SiO$ unit, 0.15 mol % of a methylvinylsiloxane $(CH_3)(CH_2=CH)SiO$ unit and 0.025 mol % of a dimethylvinylsiloxane $(CH_2=CH)(CH_3)_2SiO_{1/2}$ unit and having an average degree of polymerization of 5,000 were added 3 parts of diphenylsilane diol as a dispersant, 4 parts of silanol-terminated dimethylpolysiloxane having a degree of polymerization (n) of 10, and 40 parts of treated silica having a specific surface area of 200 m$^2$/g (Aerosil 200 commercially available from Nippon Aerosil K.K.). The ingredients were uniformly milled and heat treated at 160° C. for 2 hours, obtaining a rubber compound.

To 100 parts of the rubber compound were added 0.5 part of platinum paste A as a curing agent, 1.2 parts of organohydrogenpolysiloxane having a Si—H content of 0.005 mol/g, and 0.05 part of tetracyclomethylvinylsiloxane. The ingredients were milled to form a SiH—olefin platinum catalyst—loaded silicone rubber composition.

Example 2

A SiH—olefin platinum catalyst—loaded silicone rubber composition was formulated by the same procedure as in Example 1 except that a platinum paste was prepared using 1.0 gram of 2,4,6-tris(t-butylperoxy)-1,3,5-triazine and 89 grams of the organopolysiloxane.

Comparative Example 1

A SiH—olefin platinum catalyst—loaded silicone rubber composition was formulated by the same procedure as in Example 1 except that a platinum paste was prepared using 90 grams of the organopolysiloxane with 2,4,6-tris(t-butylperoxy)-1,3,5-triazine omitted.

Comparative Example 2

A SiH—olefin platinum catalyst—loaded silicone rubber composition was formulated by the same procedure as in Example 1 except that a platinum paste was prepared by using 2,4,6-trihydroxy-1,3,5-triazine (which is free of a peroxy group) instead of 2,4,6-tris(t-butylperoxy)-1,3,5-triazine.

Comparative Example 3

A SiH—olefin platinum catalyst—loaded silicone rubber composition was formulated by the same procedure as in Example 1 except that the platinum paste used in Comparative Example 1 was used and a conventional known control agent, ethynylcyclohexanol was added to the composition in an amount of 0.1% by weight based on the composition.

Each of the resultant silicone rubber compositions was allowed to stand in a dryer at 40° C. such that no air was directly blown to the composition. A gel time was measured. The gelling point was judged by milling a sheet of 1 mm thick between two rolls ten rounds, wrapping the sheet around the roll, observing the sheet whether or not the surface texture was smooth. When the surface texture was smooth, the sheet was judged not gelled. The results are shown in Table 1.

TABLE 1

|  | Example 1 | Example 2 | Comparative Example 1 | Comparative Example 2 | Comparative Example 3 |
| --- | --- | --- | --- | --- | --- |
| Tris(t-butylperoxy)-triazine content, wt % | 0.1 | 0.05 | 0 | 0 | 0 |
| Trihydroxy-triazine content, wt % | 0 | 0 | 0 | 0.1 | 0 |
| Ethynylhexanol content, wt % | 0 | 0 | 0 | 0 | 0.1 |
| Gel time at 40° C. | 20 days | 12 days | 3 hours | 5 hours | 2 days |

As is evident from Table 1, silicone rubber compositions within the scope of the present invention (Examples 1 and 2) are potentially curable compositions which are stabilized against premature gelation. Next the compositions of Example 1 and Comparative Example 3 were cured and post cured at 200° C. for 4 hours into sheets which were measured for physical properties. The experiment was repeated in the same manner as above except that the composition of Example 1 which had been allowed to stand for 15 days was used. The results are shown in Table 2.

TABLE 2

|  | Comparative Example 3 | Example 1 | Example 1 (after 15 days) |
| --- | --- | --- | --- |
| Specific gravity @ 25° C. | 1.20 | 1.21 | 1.21 |
| Hardness, JIS A scale | 70 | 70 | 70 |
| Tensile strength, kgf/cm$^2$ | 117 | 111 | 113 |
| Elongation, % | 510 | 510 | 515 |
| Tear strength, kgf/cm | 33 | 35 | 34 |
| Impact resilience, % | 42 | 41 | 42 |
| Compression set @ 180° C./22 hr., % | 18 | 17 | 18 |

As is evident from Table 2, a silicone rubber composition within the scope of the present invention yields a silicone rubber having physical properties equivalent to those of a conventional silicone rubber composition loaded with ethynylhexanol as a control agent, indicating that the working life at room temperature can be extended without detracting from rubber physical properties.

Examples 3–5

A platinum paste B was prepared by mixing 10 grams of a low-degree-of-polymerization dimethylvinylpolysiloxane substituted solution of a chloroplatinic acid-alcohol solution (having a vinyl content 0.7 mol % and a platinum content of 1.0%) and 90 grams of an organopolysiloxane having a vinyl content of 0.15 mol % and an average degree of polymerization of 5,000.

To 100 parts of an organopolysiloxane consisting of 99.85 mol % of a dimethylsiloxane $(CH_3)_2SiO$ unit and 0.15 mol % of a methylvinylsiloxane $(CH_3)(CH=CH_2)SiO$ unit and terminated with a dimethylvinylsiloxane $(CH_3)_2(CH=CH_2)SiO_{1/2}$ unit at either end were added 45 parts of fumed silica (Aerosil 200 commercially available from Nippon Aerosil K.K.) and 7 parts of hydroxyl-endblocked dimethylsilicone fluid having a degree of polymerization (n) of 10. The ingredients were mixed in a kneader and then heat treated at 160° to 170° C. for 2 hours, obtaining a rubber compound.

To 100 parts of the rubber compound were added 0.5 part of platinum paste B as a curing agent, 0.05 or 0.1 part of di-n-hexylsulfide, and 1.2 parts of organohydrogenpolysiloxane having a Si—H content of 0.005 mol/g. The ingredients were milled to form silicone rubber compositions (Examples 3 and 4).

A silicone rubber composition (Example 5) was prepared by the same procedure as Example 3 expect that 0.1 part of a conventional known control agent, ethynylcyclohexanol was further added to the composition of Example 3.

Comparative Examples 4–5

A silicone rubber composition (Comparative Example 4) was prepared by the same procedure as Example 3 except that di-n-hexylsulfide was omitted.

A silicone rubber composition (Comparative Example 5) was prepared by the same procedure as Example 3 except that di-n-hexylsulfide was omitted and ethynylcyclohexanol was added instead.

Examples 6–8

A platinum paste C was prepared by mixing 10 grams of a low-degree-of-polymerization dimethylvinylpolysiloxane substituted solution of a chloroplatinic acid-alcohol solution (having a vinyl content 0.7 mol % and a platinum content of 1.0%), 1.0 grams of 2,4,6-tris(t-butylperoxy)- 1,3,5-triazine (commercially available from Kayaku Akuzo K.K.), and 89 grams of an organopolysiloxane having a vinyl content of 0.15 mol % and an average degree of polymerization of 5,000.

To 100 parts of the same rubber compound as in Example 3 were added 0.5 part of platinum paste C as a curing agent, 0.02 part of ditridecyl-3,3'-thiodipropionate, and 1.2 parts of organohydrogenpolysiloxane having a Si—H content of 0.005 mol/g. The ingredients were milled to form a silicone rubber composition (Example 6).

Silicone rubber compositions (Examples 7 and 8) were prepared by the same procedure as Example 6 except that 0.01 part of di-n-hexylsulfide or n-octylsulfide was added instead of ditridecyl-3,3'-thiodipropionate.

Each of the resultant silicone rubber compositions was allowed to stand in a dryer at 40° C. such that no air was directly blown to the composition. A gel time was measured. The gelling point was judged by milling a sheet of 1 mm thick between two rolls ten rounds, wrapping the sheet around roll, observing the sheet whether or not the surface texture was smooth. When the surface texture was smooth, the sheet was judged not gelled. The results are shown in Tables 3 and 4.

TABLE 3

| Composition (pbw) | Example 3 | Example 4 | Example 5 | Comparative Example 4 | Comparative Example 5 |
|---|---|---|---|---|---|
| Rubber compound | 100 | 100 | 100 | 100 | 100 |
| Platinum paste B | 0.5 | 0.5 | 0.5 | 0.5 | 0.5 |
| Di-n-hexyl-sulfide | 0.05 | 0.1 | 0.05 | — | — |

TABLE 3-continued

| Composition (pbw) | Example 3 | Example 4 | Example 5 | Comparative Example 4 | Comparative Example 5 |
|---|---|---|---|---|---|
| Ethynyl-cyclo-hexanol | — | — | 0.1 | — | 0.1 |
| Organo-hydrogen-poly-siloxane | 1.2 | 1.2 | 1.2 | 1.2 | 1.2 |
| Gel time at 40° C. | 6 days | 15 days | 10 days | 15 minutes | 1 day |

TABLE 4

| Composition (pbw) | Example 6 | Example 7 | Example 8 |
|---|---|---|---|
| Rubber composition | 100 | 100 | 100 |
| Platinum paste C | 0.5 | 0.5 | 0.5 |
| Ditridecyl-3,3'-thiodipropionate | 0.02 | — | — |
| Di-n-decyldisulfide | — | 0.01 | — |
| n-Octylsulfide | — | — | 0.01 |
| Organohydrogenpolysiloxane | 1.2 | 1.2 | 1.2 |
| Gel time at 40° C. | 30 days | 28 days | 30 days |

As is evident from Tables 3 and 4, silicone rubber composition within the scope of the present invention (Examples 3–8) have a very long gel time at 40° C. and are potentially curable compositions which are stabilized against premature gelation.

Japanese Patent Application Nos. 5-312534 and 6-108963 are incorporated herein by reference.

While this invention has been described with respect to a preferred embodiment, it will be understood by those skilled in the art that various changes and modifications may be made without departing from the spirit and scope of the invention.

We claim:

1. A silicone rubber composition comprising (A) an organopolysiloxane of the following avenge compositional formula (1):

$$R^1{}_a SiO_{(4-n)/2} \tag{1}$$

wherein $R^1$ is a substituted or unsubstituted monovalent hydrocarbon group, the $R^1$ groups may be identical or different, and letter n is a positive number of 1.98 to 2.02, containing at least two aliphatic unsaturated groups in a molecule, (B) an organohydrogenpolysiloxane of the following average compositional formula (2):

$$R^2{}_a H_b SiO_{(4-a-b)/2} \tag{2}$$

wherein $R^2$ is a substituted or unsubstituted monovalent hydrocarbon group, the $R^2$ groups may be identical or different, letters a and b are in the range: $0 \leq a < 3$ and $0.005 \leq b \leq 2$, and $0.8 \leq a+b \leq 3.0$, having at least two hydrogen atoms attached to silicon atoms in a molecule, (C) a platinum series catalyst, and (D) 0.005 to 1 part by weight of a control agent per 100 parts by weight of the organopolysiloxane (component A), wherein said control agent is selected from the group consisting of a triazine of the following general formula (3):

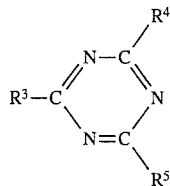

wherein $R^3$, $R^4$, and $R^5$ are independently selected from the group consisting of a peroxy group, monovalent hydrocarbon group, hydroxyl group and hydrogen atom, at least one of $R^3$, $R^4$ and $R^5$ being a peroxy group, and a sulfide of the following general formula (4):

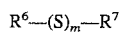

wherein each of $R^6$ and $R^7$ is a monovalent hydrocarbon having at least 3 carbon atoms or a monovalent hydrocarbon group having an ester bond or $R^6$ and $R^7$ taken together may form a ring structure, and letter m is a positive number of 1 to 3.

2. The silicone rubber composition of claim 1 wherein said sulfide is a monosulfide.

3. The silicone rubber composition of claim 1 which further includes at least one component selected from the group consisting of a vinyl siloxane having a low degree of polymerization, a hydroperoxide, an ethylenically unsaturated isocyanurate, an acetylene alcohol, and a peroxide having a carbon-to-carbon unsaturated bond.

4. The silicone rubber composition of claim 1 which further includes a blowing agent.

5. The silicone rubber composition of claim 1 wherein said sulfide is a monosulfide.

6. The silicone rubber composition of claim 1 which further includes at least one component selected from the group consisting of a vinyl siloxane having a low degree of polymerization, a hydroperoxide, an ethylenically unsaturated isocyanurate, an acetylene alcohol, and a peroxide having a carbon-to-carbon unsaturated bond.

7. The silicone rubber composition of claim 1 which further includes a blowing agent.

8. A silicone rubber composition as in claim 1 wherein $R^1$ is selected from allyl groups, cycloallyl groups, alkenyl groups and aryl groups, halo-substituted derivatives thereof and cyano-substituted derivatives thereof.

9. A silicone rubber composition as in claim 8 wherein the alkenyl groups within the organopolysiloxanes comprise 0.001 to 20 mol % of the entire $R^1$ groups.

10. A silicone rubber composition as in claim 1 wherein the organohydrogenpolysiloxane is selected from the group consisting of diorganopolysiloxane end-blocked with a dimethylhydrogensilyl group; a co-polymer of a dimethyl siloxane unit, a methylhydrogensiloxane unit and a terminal trimethylsiloxy unit; a low viscosity fluid consisting of dimethylhydrogensiloxane units ($H(CH_3)_2SiO_{1/2}$ unit) and a $SiO_2$ unit, 1,3,5,7-tetrahydrogen-1,3,5,7-tetramethylcyclosiloxane; 1-hydropropyl-3,5,7-trihydrogen-1,3,5,7-tetramethylcyclotetrasiloxane and 1,5-dihydrogen-3,7-dihexyl-1,3,5,7-tetramethylcyclotetrasiloxane.

11. A silicone rubber composition as in claim 1 which comprises a control agent selected from triazine where $R^3$, $R^4$, and $R^5$ are all peroxy groups.

12. A silicone rubber composition as in claim 11 wherein the peroxy group is selected from those of the formula:

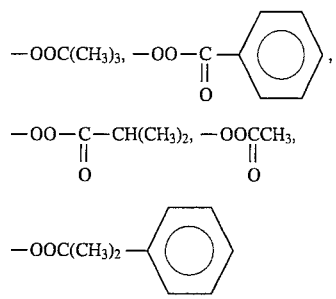

13. A silicone rubber composition as in claim 1 wherein the sulfide is selected from the group consisting of

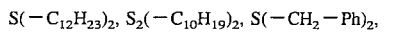

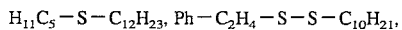

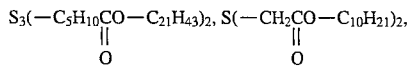

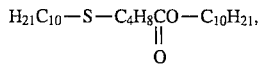

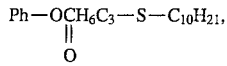

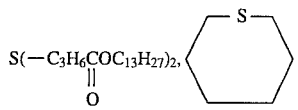

14. A silicone rubber composition as in claim 1 which contains at least two control agents.

15. A silicone rubber composition as in claim 14 wherein one of the control agents is selected from acetylene alcohols, vinylsiloxanes hydroperoxides and ethylenically unsaturated isocyanurates and peroxides containing a carbon to carbon unsaturated bond.

16. A silicone rubber composition as in claim 15 wherein the amount of one of the control agents falls within the range of about 0.001 to 1 part by weight per 100 parts by weight of the organopolysiloxane (component (A)).

* * * * *